United States Patent [19]

McBrien

[11] Patent Number: 4,738,527

[45] Date of Patent: Apr. 19, 1988

[54] APPARATUS AND METHOD FOR DETERMINING POSITION WITH LIGHT

[75] Inventor: Gregory J. McBrien, Portland, Conn.

[73] Assignee: United Technologies Corporation, Hartford, Conn.

[21] Appl. No.: 876,137

[22] Filed: Jun. 19, 1986

[51] Int. Cl.[4] .......................... G01C 3/08; G01B 9/02; G01B 11/02

[52] U.S. Cl. ......................... 356/5; 356/4.5; 356/352; 356/357

[58] Field of Search ............ 356/5, 4.5, 352, 355–358; 350/96.15; 367/149

[56] References Cited

U.S. PATENT DOCUMENTS

| | | | |
|---|---|---|---|
| 3,238,839 | 3/1966 | Day, Jr. | 356/355 |
| 3,409,370 | 11/1968 | King et al. | 356/5 |
| 3,611,277 | 10/1971 | Yoder | 356/5 |
| 3,679,313 | 7/1972 | Rosenberg | 356/352 |
| 3,733,129 | 5/1973 | Bridges | 356/5 |
| 3,788,743 | 1/1974 | George | 356/352 |
| 4,269,506 | 5/1981 | Johnson et al. | 356/5 |
| 4,309,109 | 1/1982 | Blodgett et al. | 356/355 |
| 4,422,167 | 12/1983 | Shajenko | 367/149 |
| 4,443,107 | 4/1984 | Alexander et al. | 356/358 |
| 4,446,543 | 5/1984 | McLandrich et al. | 350/96.15 |
| 4,500,979 | 2/1985 | Scott | 367/149 |
| 4,604,898 | 8/1986 | Gohin et al. | 73/701 |

Primary Examiner—Stephen C. Buczinski
Attorney, Agent, or Firm—Francis J. Maguire, Jr.

[57] ABSTRACT

Apparatus and method is disclosed for determining position with light by providing input light at an input light port of an optical cavity having a variable length dimension and detecting light which has traversed the variable length dimension at an output light port of the optical cavity and determining the present length of the variable length dimension using the detected light as a measure.

5 Claims, 7 Drawing Sheets

APPARATUS AND METHOD FOR DETERMINING POSITION WITH LIGHT

DESCRIPTION

1. Technical Field

This invention relates to position transducers using light as a measure and, in particular, relates to the measurement of linear position using an optical cavity having a variable length dimension.

2. Background Art

Position sensors employing light as a measure offer a passive, nonconductive solution to the electromagnetic interference and space problems in aircraft and other control systems that require lightweight, interference tolerant sensors. Presently, these systems have undesirable aspects of high cost and complexity.

Several position sensing systems employing optical fiber based, electrically passive methods have been developed. Perhaps the most mature design is the one employing digitally encoded face plates to impress a binary pattern of light into a fiber signal channel. This method requires parallel fibers for each binary channel. To achieve the desired resolution and range, many fibers must be used. These have the advantage of being inherently digital and therefore noise immune without suffering performance degradation. Other methods involve amplitude encoding of one or more channels, which produce problems where connector or link variations occur. Still other methods include time domain and wavelength multiplexing. See U.S. Pat. No. 4,546,466 for an example of an optical encoder.

What is needed is a different sensing method with simplified optical hardware and where loss variations in the channel do not have a primary impact on system performance.

DISCLOSURE OF THE INVENTION

The object of the present invention is to provide an apparatus and method for sensing position with light using extremely simple optical hardware and in which loss variations in the channel do not have a primary impact on system performance.

According to the present invention, input light is provided at an input light port of an optical cavity having a variable length dimension. The input light which has traversed the variable length dimension is detected at an output light port of the optical cavity. The present length of the variable length dimension is determined using the detected light as a measure.

The means provided for accomplishing the above described method may include various means for providing input light and detecting the light after it has traversed the variable length dimension of the cavity.

One such apparatus comprises an optical fiber input port inserted into a variable length optical cavity filled with a fluid which matches the index of refraction of both the input port optical fiber and an optical fiber output port positioned in such a manner as to receive the input light. If the input light comprises a pulse of light, the time taken for the pulse to traverse the variable length of the cavity can be timed by providing a detector at the output port. The length of the cavity can be inferred from the time taken for the light to traverse the cavity. The object whose position is to be measured is mechanically coupled to the cavity so as to directly influence its variable length. Another such apparatus comprises a moveable mirror at one end of the cavity's variable length dimension and a second mirror at the other end for reflecting the input light between the mirrors. The light provided may be input light having a time-varying intensity with a frequency which may be changed. This "mirrored" embodiment may also be used in the pulsed application described above, i.e., for the non-continuous wave method. One of the principles upon which this embodiment of the invention is predicated is that the frequency corresponding to the maximum detected intensity will have a wavelength which is a multiple of the distance between the mirrors. In other words, the reflecting waves will interfere constructively and oscillations will be sustained, thereby maximizing the detected intensity. The length between the mirrors can thereby be inferred using the wavelength of the maximizing frequency as a measure. The apparatus further comprises means for changing the frequency of the input light time-varying intensity in order to determine the frequency at which the detected intensity of the output light is maximum. This may be accomplished in such an apparatus by providing means for detecting the average intensity of the input light as the frequency is changed over a range of frequencies.

Thus, in further accord with the present invention, the above described input light to the mirrored embodiment may be provided as an input light pulse. By measuring the time taken for the pulse to traverse the distance between the input and output ports, a determination of the distance between ports may be made by relating the measured time to the speed of light between the ports. The distance between the ports may then be related to the present length dimension.

In further accord with the present invention, input light may be provided at a time-varying intensity at an input light port of any optical cavity capable of sustaining oscillations induced by constructive interference of the modulating frequency. Inside the cavity there is at least a first mirrored surface for reflecting the input light and at least a second mirrored surface for reflecting the reflected input light back to the first mirrored surface. Either one of the first or second mirrored surfaces may be moveable. The frequency of the input light time-varying intensity may be changed so that the frequency at which the average intensity of the output light is maximum may be determined. Means for detecting the average intensity of the input light are provided at the output light port. The length dimension of the cavity is determined by determining the frequency at which the detected average intensity of the light is maximum and by relating the wavelength of the maximizing frequency to the distance between the ports and then relating the distance between the ports to the length dimension.

In further accord with the present invention, in the continuous wave embodiments and methods, the modulation frequency of the intensity modulated light may be increased and decreased, or "dithered" over a relatively narrow frequency modulation range above and below the operating frequency in order to produce, by virtue of the frequency transfer characteristic of the variable length cavity, amplitude modulation in the amplitude modulated reflected light which is indicative of the difference between the operating frequency of intensity modulation and the frequency at which the detected intensity of the output light is maximum. The cavity will have a different frequency transfer characteristic for each of the possible lengths which it may assume.

The amplitude modulated envelope of the amplitude modulated reflected input light is detected and provided as a zero-averaged envelope signal to a synchronous demodulator which demodulates the envelope signal with respect to a signal indicative of the "dither" frequency. The demodulator provides an error signal indicative of the difference between the maximizing frequency of amplitude modulation and the modulating frequency. The error signal is integrated to provide a modulation frequency command signal for commanding a modulation frequency at the maximizing frequency. By commanding the maximizing frequency, the error signal is zeroed.

In still further accord with the present invention, input light is provided at an input light port of an optical cavity comprising an optical fiber delay line having an index of refraction matched to the index of refraction of a fluid in a tube in which said delay line is inserted. This permits light to be propagated across the interface between the delay line and the fluid as if the interface were transparent. The fiber delay line has a mirrored surface at the input light port end and the tube has a moveable mirror at an end opposite from which the delay line is inserted for reflecting the input light back to the mirrored surface end of the delay line in which there is also located the output port. Movement of the moveable mirror changes the length of the cavity.

In still further accord with the present invention, input light is provided from a light source along an optical fiber to the input light port and output light is provided from said output light port along an optical fiber to a detector.

The present invention provides a simple optical method and apparatus which makes use of a new position sensing approach which comprises measuring a variable length with light pulses. An elaboration of the disclosed method and apparatus comprises developing a frequency corresponding to length changes in a passive optical resonant cavity. The continuous wave approach has the advantage of simple electronic control as well as the extremely simple optical hardware of the pulse approach. And since, in the resonant cavity method and apparatus embodiment, the information is encoded in frequency, loss variations in the channel do not have a primary impact on system performance.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
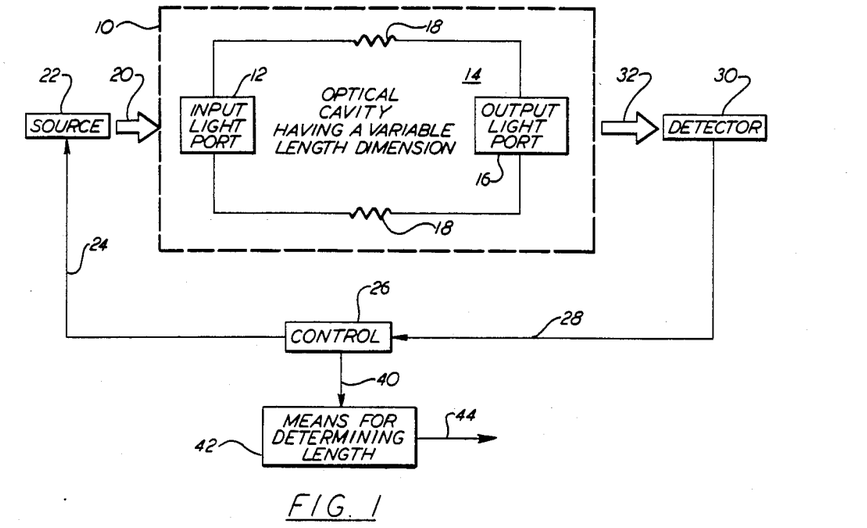
FIG. 1 is a simplified block diagram illustration of an apparatus for determining position with light, according to the present invention.

FIG. 1 is a block diagram illustration of an apparatus 10, according to the present invention, comprising an input light port 12, an optical cavity 14 having a variable length and an output light port 16. The variable length of the optical cavity is indicated by accordion-like symbols 18 which may be thought of as stretchable or compressible depending, respectively, on whether the length dimension is lengthened or shortened. A central teaching of the present invention is that such an optical cavity with input and output light ports can be constructed of extremely simple hardware of very small dimensions. Various embodiments of the apparatus according to the present invention are shown in FIGS. 1, 2, 6, 7 and 10. The apparatus 10 of FIG. 1 illustrates the central apparatus concept more simply than the illustrations of FIGS. 2, 6, 7 and 10. It will be understood by those skilled in the art, that numerous variations on the central apparatus concept presented in the apparatus 10 of FIG. 1 are possible. The embodiments shown herein are merely illustrative of several of these various means for carrying out the inventive concepts presented herein.

The apparatus 10 of FIG. 1 is provided with input light as indicated by a line 20 by a light source 22 which has its intensity controlled by a control signal on a line 24 from a control 26.

Figure 2:
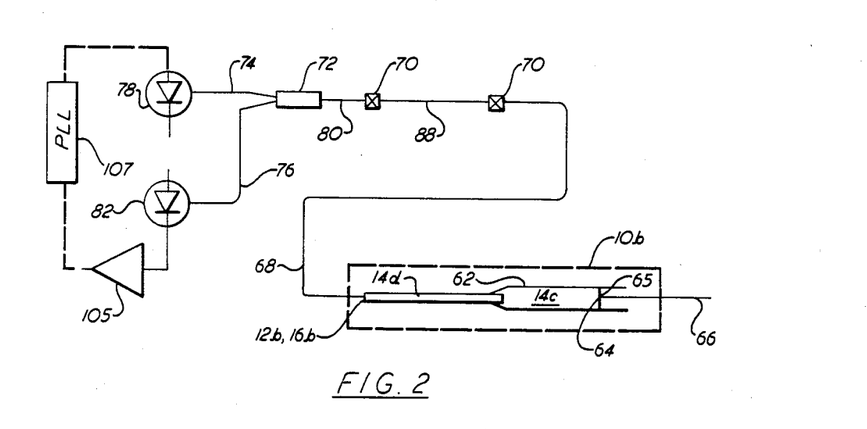
FIG. 2 is a simplified illustration of an apparatus for determining position with light, according to the present invention.
Figure 6:
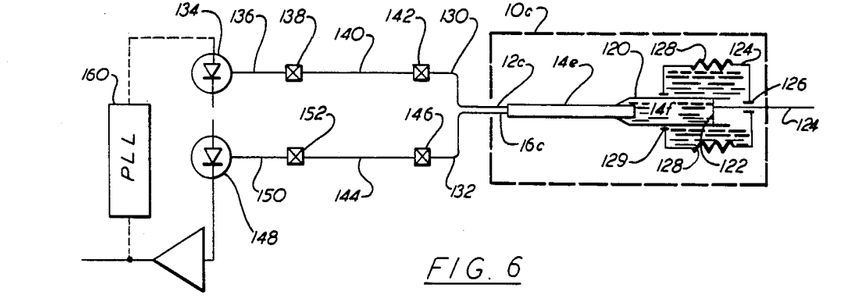
FIG. 6 is an illustration of an apparatus for determining position with light, according to the present invention.
Figure 7:
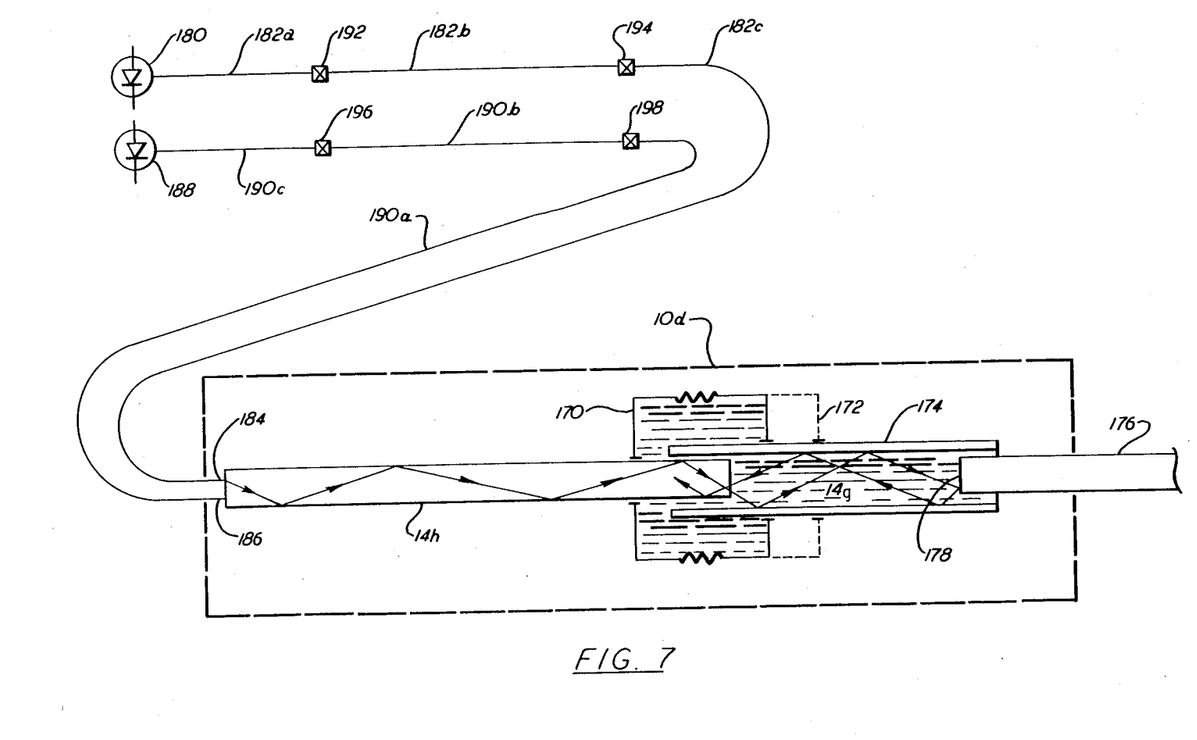
FIG. 7 is an illustration of an apparatus for determining position with light, according to the present invention.
Figure 8:
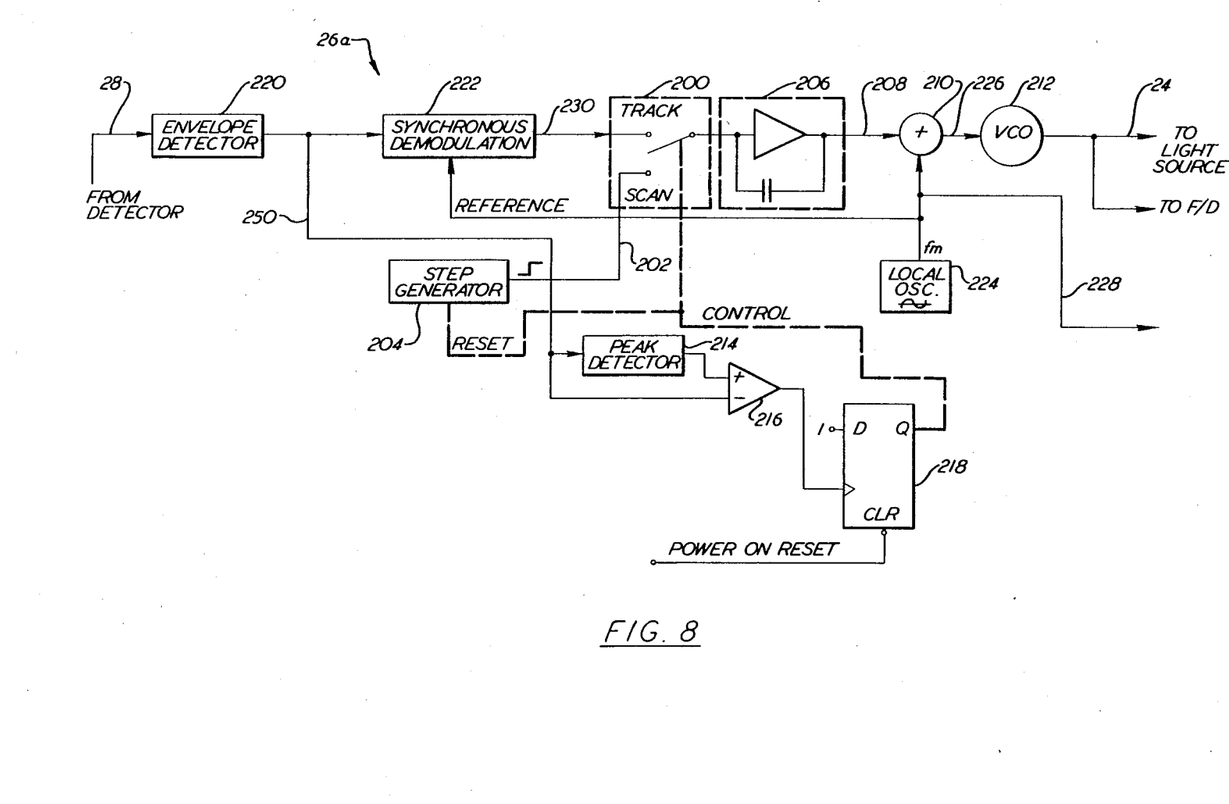
FIG. 8 is an illustration of a control circuit for providing closed loop control of the frequency input to an optical cavity having a variable length dimension.

A signal on a line 28 from an output light detector 30 is provided to the control 26 and is indicative of the intensity of light received on a line 32 exiting from output light port 16 after traversing the cavity 14. One purpose for the signal 28 from the detector 30, for example, in the continuous wave applications of the embodiments of FIGS. 2, 6 and 7 is to provide a feedback signal for closing a control loop which controls the frequency of the time-varying intensity of the source 22. A control circuit for such applications is shown in FIG. 8 and will be described in more detail subsequently in connection with FIG. 7. For an application in which the apparatus 10 of FIG. 1 is used in conjunction with a pulsed source, the signal on line 28 may be used simply for timing the pulse as it exits after crossing the optical cavity. Output light as indicated on a line 32 from the output light port 16 can emerge from the output light port after only one traverse of the optical cavity or after several traverses, depending on whether or not there are mirrors within the cavity for reflecting input light within the cavity. Such mirrors would be used in the embodiments of FIGS. 2, 6 and 7 in which the principle of constructive interference is used to sustain oscillations for input source light having its intensity modulated at a frequency corresponding to the resonant frequency of the cavity at its length. In other words, the optical cavity will have a wide variety of possible resonant frequencies, depending upon its length. Thus, if light is input into a light port of any of the embodiments of FIGS. 2, 6 and 7, constructive interference can be effected by providing input light intensity modulated at the resonant frequency of the cavity to a reflective surface within the cavity so as to cause the input light to be returned to another mirror where it can be bounced back and forth many times to reinforce additional input light entering the cavity.

Figure 5:
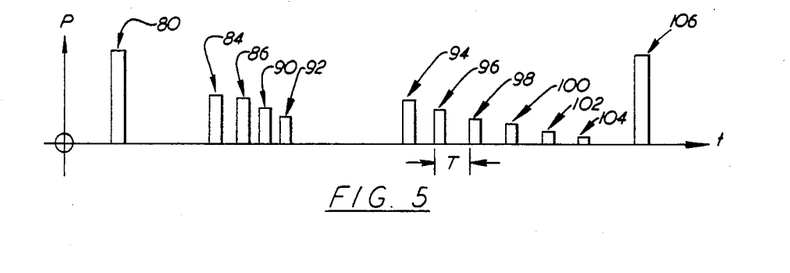
FIG. 5 an illustration of a series of waveforms indicating input pulses and reflected pulses detected at a detector in FIG. 2.

Mirrors may also be used in pulsed source applications. In such applications the input pulse decays as it reflects back and forth between the mirrors. One can measure the frequency of the decaying oscillations while they decay. The accuracy of such a system will depend primarily on the conditioning electronics' ability to measure the returned frequency pulse. A gated voltage controlled oscillator (VCO) might be employed to gradually aquire the returned frequency and lock to it. Blanking is needed in that case to reject connector reflections. A representation of both the input pulse and the returned signals, including reflections, is illustrated in FIG. 5 in connection with the embodiment of FIG. 2, which will be more fully described subsequently.

Figure 9:
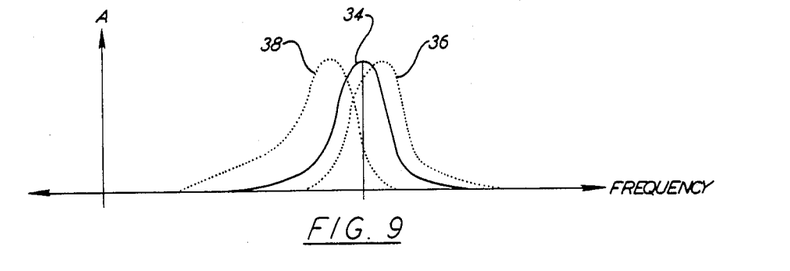
FIG. 9 is an illustration of a frequency transfer characteristic of an optical cavity having a variable length dimension.

FIG. 9 is an illustration, for continuous wave applications, of a frequency response curve 34 of a cavity at one of its many possible length dimensions. Another, higher frequency response 36 is shown for another length dimension. Similarly, yet another, lower frequency response 38 is shown for yet another length dimension of the cavity, in a direction opposite from that of the response 36. In other words, if the response 36 represents the response of the cavity for a length dimension shorter than that of the length it has when exhibiting the response 34, the response 38 corresponds to a cavity having a longer dimension than that of the response 34.

Referring back to FIG. 1, a signal on a line 40 indicative of the intelligence required to make a length dimension determination is provided to means 42 for determining length, which may comprise a signal processor well known in the art. An output signal on a line 44 provides a signal having a magnitude indicative of the length dimension for outside use.

The present invention is directed not only to the apparatus 10 of FIG. 1 but also to the method of providing light at an input light port for transmission in an optical cavity having a variable length dimension and providing such light at an output port after traverse of the cavity for detection, in order to use that light as a measure of the length of the cavity.

Figure 10:
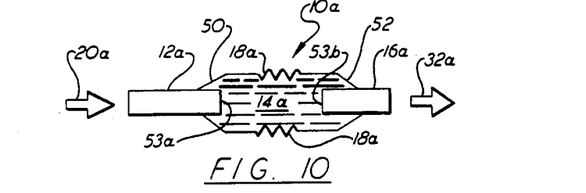
FIG. 10 is an illustration of an apparatus for determining position with light, according to the present invention.

FIG. 10 is an illustration of an embodiment 10a of the apparatus according to the present invention. A variable length optical cavity 14a is filled with a fluid having an index of refraction which matches the indices of refraction of optical fiber input port 12a and output port 16a. The ports are inserted in the ends of the cavity and sealed therein. The cavity is of variable length as indicated by accordion-like elements 18a, as in FIG. 1. Cavity 14a may be a flexible bladder or a metal tube having flexible metal accordion-like sections. One end 50 may be fixed and another end 52 moveable with respect thereto. In that case, the end 52 would be attached to a piece or shaft of an object whose position is to be measured. As mentioned, the input and output light ports 12a, 16a may be optical fibers. In that case, the optical index of refraction of the fluid would be on the order of about 1.5. Of course, the cavity could be made of a hollow cylindrical tube and the variable length could be provided by a port sliding in and out of the tube. In that case, the bladder would be external to the tube, as in the embodiment of FIG. 7.

In the embodiment of FIG. 10, the input light 20a could be a light pulse which traverses the optical fiber 12a and transparently crosses the barrier between the fiber 12a and the fluid in the cavity 14a (because of the index of refraction being matched), traverses the fluid in the cavity, and exits transparently through the optical fiber 16a for pickup by a detector 30, such as is shown in FIG. 1. The timing of a such a pulse as it traverses the distance between the source and the detector can be used as a measure of the position of the end 52 with respect to the end 50 of the sensor 10a of FIG. 10. This might be accomplished by triggering a counter at the time the input pulse is provided and stopping the count at the reception of the pulse at the detector. For the case where the fibers 12a and 16a have mirrored surfaces 53a, 53b, there will be a decaying reflection and this would be accomplished in the control 26 of FIG. 1 using the timing circuitry described above and well known in art.

It should be noted that the variable length dimension aspect of the cavity 14 of FIG. 1 may be accomplished in any of a wide variety of different ways. For example, instead of using an accordion-like piece 18 and 18a as shown in FIGS. 1 and 10, the output light port 16a could be moveable within the cavity 14a. This will be an especially effective method, as in the embodiment illustrated in FIG. 7, in which the output and input light ports are both incorporated at one end of the cavity in a single optical delay line and in which the output light port 16 and 16a of FIGS. 1 and 10 have been replaced by a moveable piston having a mirrored surface on the end inserted into the cavity. An external bladder is provided to permit fluid to enter and exit the cavity with movement of the piston.

It may be disadvantageous to utilize timing circuitry for timing the duration of the traverse of a single pulse or the frequency of reflections thereof in a cavity such as described above in certain situations in which the complexity of the circuitry is to be minimized. Similarly, it may be more desirable to provide a cavity in which internal reflections of a continuous wave input are provided for, so as to induce sustained oscillations at certain wavelengths of intensity modulation.

FIG. 2 is an illustration of a position sensor 10b with an optical cavity 14c, 14d and a combined input/output port 12b, 16b. The cavity 14c, 14d comprises an optical fiber delay line 14d having a mirrored surface at the input/ouput end and having an index of refraction which is matched by a fluid contained in the cavity 14c which may be the hollow of a long cylindrical tube 62. A mirrored surface 64 in the form of a moveable disk 65 seals the other end of the cavity 14c. A rod or piston 66 is attached to the object whose position is to be measured.

Figure 2A:
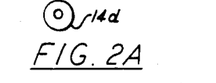
FIG. 2A is an end view of the optical delay line of FIG. 2 as viewed from the input/output port end of the delay line.

FIG. 2A shows the end of the optical delay line 14d as viewed from the input/output end. A small circular portion of the mirrored surface is etched away and an optical fiber 68 is butted up and heated to melt onto and bond to the delay line. Altenatively, the optical fiber 68 may be adhesively bonded with optical adhesive to the delay line. The optical fiber 68 serves as both the input and output line from the sensor, in this particular embodiment. A number of connectors 70 will normally be required in aircraft applications and are shown close to an optical coupler or combiner-splitter 72 which splits an optical fiber 80 into two branches 74, 76.

In the embodiment of FIG. 2 a light source 78 is pulsed on as shown by a pulse 80 in FIG. 5 on a time line. The pulse propagates along fiber 74 until it reaches the coupler 72. Most of the light entering the coupler is propagated through the coupler onto the optical fiber 80. However, a small portion is reflected back to the source 78 on fiber 74 and also back to a detector 82 on fiber 76. A reflection pulse 84 is picked up by the detector 82 in this way. Similarly, a reflection pulse 86 is picked up by the detector 82 as a result of reflection of the light propagated on fiber 80 to connector 70. Again, most of the energy is propagated on a fiber 88 but some energy is reflected back to the detector 82 and shows up as pulse 86. Similarly, a reflection is also made at connector 70 as evidenced by a reflection pulse 90. Another reflection is made at the input port 12b as evidenced by a reflection pulse 92. Of course, the relative positions of these reflection pulses will vary and are not drawn to scale as they depend in position upon the relative lengths of the optical fiber transmission lines.

Once the pulse 80 has reached the input port 12b, it enters the optical delay line 14d portion of the variable length cavity. The pulse propagates down the delay line until the end of the delay line is reached. Since the fluid in the cavity 14c has the same, or nearly the same, index of refraction as the optical delay line 14b, the interface is transparent and the pulse 80 will propagate across the boundary without reflection. It will continue to propagate across the cavity 14c until it reaches the mirrored surface 64 at which point it is reflected back across the cavity 14c, across the boundary between the cavity 14c and the delay line 14d, through the delay line 14d to the output light port 16b. At this point a portion of the reflected light will exit the sensor 10 and propagate back to the detector 82 along fiber-optic lines 68, 88, 80, 76. A first reflected pulse 94, as shown in FIG. 5, will be picked up by detector 82. The timing of the arrival of this pulse 94 with respect to the timing of the input pulse 80 may be used to measure the position of the piston 66.

Additional internal reflections of the pulse 80 will take place within the sensor 10b and additional return pulses 96, 98, 100, 102, 104 will continue to be picked up by the detector 82 until they die out. An amplifier 105 is responsive to the detected pulses 94-104 and provides amplified versions of these signals to means for determining length similar to the means shown in FIG. 1. An additional pulse 106 may be sent at a later time in order to determine if any position changes have taken place.

The time between occurances of reflections may be measured as well. I.e., the frequency of the decaying oscillation may be measured by using a gated VCO to gradually acquire the returned frequency and lock to it using a phase locked loop 107. Blanking is required to reject connector reflections.

FIG. 6 is another embodiment 10c of the apparatus of the present invention. An optical cavity having a variable length dimension comprises an optical delay line 14e inserted into a hollow tube 120 having a cavity 14f filled with a liquid having an index of refraction matched to that of the delay line 14e. A mirrored disk 122 is held in a moveable position much like a piston in a cylinder by a rod 124 which is attached to an object whose position is to be measured.

Figure 3:
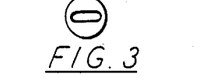
FIG. 3 is an end view of the input/output end of an optical delay line similar to that of FIG. 6 or 7.
Figure 4:
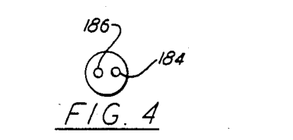
FIG. 4 is an end view of the input/output end of an optical delay line similar to that of FIG. 6 or 7.

The sensor 10c of FIG. 6 includes a flexible bladder 124 capable of either expanding or contracting to accept more or less fluid from the cavity 14f depending on the position of the disk 122. Liquid from the cavity flows past the edges of the disk into the bladder which is sealed around the piston rod 124 by seals 126 and around the tube 120 by seals 129. The flexible nature of the bladder is indicated by accordion-like symbols 128. In fact, if a bladder is not used, these may be metallic accordion-like devices which serve a function similar to that of a bladder. The sensor 10c of FIG. 6 is shown having a separate input port 12c and a separate output port 16c, each associated with separate optical fibers 130, 132. An input light source 134 provides input light on a fiber 136 to a connector 138 and onto a fiber 140 for connection to fiber 130 at a connector 142. Output fiber 132 connects to a fiber 144 by means of a connector 146. A detector 148 is connected to fiber 144 by means of an optical fiber 150 and a connector 152. The separate input/output ports 12c, 16c may be etched from the end of the optical delay line 14e as similarly shown in FIG. 4 or FIG. 3. Of course, many variations of such connections are possible. Each of the optical fibers 130, 132 may be butted up and heated to flow so as to melt onto the delay line 14e. As in the embodiment of FIG. 2, they may also be adhesively bonded with optical adhesive.

Figure 11:
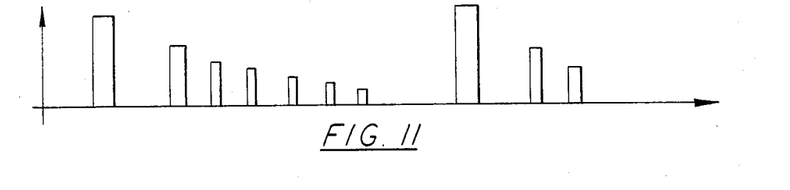
FIG. 11 is an illustration of input pulses provided to an apparatus such as that shown in FIGS. 6 and 7 and also showing reflections back from the cavity with no reflection caused by connectors, such as in FIG. 5.

The sensor 10c of FIG. 6 may be used in a pulsed fashion, as was the case in the apparatus of FIG. 2. In that case, pulses will be sent out periodically by source 134 as shown in FIG. 5 or FIG. 11, which is similar to FIG. 5 except that no reflections are shown because of the split nature of the input and output optical fiber lines. Also, the relative positions of the output light pulses in FIG. 11 with respect to the input pulse are different from that shown in FIG. 5 because of different lengths of optical fibers and delay lines.

Alternatively, the sensor 10c of FIG. 6 may be used in a tuned cavity application. If the cavity 14f is thought of as having a length "a" (which is variable) and the delay line is thought of as having a length "b" (which is fixed), the total length of the cavity is (a+b) and the intensity of the light admitted into the cavity can be modulated at a frequency having a wavelength ($\lambda$) satisfying the equation $\lambda = 2(a+b)/n$, where n is a whole number, which results in constructive interference of the intensity modulation of the reflected lightwaves. A phase locked loop 160 may be used to modulate the input light intensity in a continuous wave fashion. The frequency of modulation is varied to find a resonance. The resonant wavelength is equal to $2(a+b)/n$, where n is a whole number, and proportional to the input position of the object to be measured.

FIG. 7 is an illustration of an embodiment 10d of the apparatus of the present invention. It is very similar to the embodiment 10c shown in FIG. 6 except that a bladder 170 is located at the delay line end rather than the piston end, as in FIG. 6. The bladder 170 is shown having a position shown in solid lines and a continuously expandable position 172 shown in dashed lines. This is intended to be suggestive of the continuous expansion capabilities of the bladder in schematic fashion. The actual mechanical details of the bladder, seals, etc., are not shown in detail, as expandable bladders are known, and merely need to be adapted for the present application to permit a cavity 14g in a tube 174 to be always filled with fluid regardless of the position of the sensor input shaft. The fluid may flow between the inner tube walls and the outer walls of an optical delay line 14h or, as in FIG. 6, between the edges of the piston disk 122 and the inner tube walls.

Referring back to FIG. 7, a piston 176 having a mirrored surface 178 is inserted in one end of tube 174 and is moveable therein, depending upon the position of an object whose position is to be measured and which is attached to piston 176 (not shown).

A light source 180 provides input light along an optical fiber 182a, 182b, 182c to an input port 184 at one end of the optical delay line 14h. The optical delay line 14h may be nothing more than a larger optical fiber having the same optical properties as fiber 182c except being oversized so as to be able to provide an output port 186 for receiving reflected waves and transmitting them back to a detector 188 along optical fibers 190a, 190b, 190c. Of course, as in FIGS. 2 and 6, optical fiber connectors 192, 194, 196, 198 may be required for a practical system in which the source 180, the detector 188, and the sensor 10d are purchased from different sources. Of course, if made by the same manufacturer, and a permanent connection were desired, the connectors would be unnecessary.

Referring back to FIG. 4, the end of the delay line 14h is shown as viewed from the left of FIG. 7. There, the input port 184 and the output port 186 are shown as circular portions etched into the mirrored surfaces end of the delay line 14h. Thus, the reflectivity of the mirrored surface at the left hand end of the delay line 14h of FIG. 7 will have a reflectivity of less than one. The reflectivity of the mirrored surface 178 of the piston 176 may be thought of as a nearly perfect one.

If the sensor 10d of FIG. 7 is used in a continuous wave application, the constructive interference of a continuous wave input light beam modulated at a frequency having a wavelength which is a multiple of the length of the variable length cavity will produce sustained oscillations which may be detected as an intensity maximum by the detector 188.

A simplified ray diagram is shown in FIG. 7 showing an input wave bouncing off the internal walls of the optical delay line and also the internal walls of the tube until it bounces off the mirrored surface 178 and heads back to the output port 186. The wave shown in FIG. 7, if of the proper wavelength, will constructively interfere on both the course from the input port to the mirrored surface 178 and back from the mirrored surface 178 to the output port 186. This will produce an intensity maximum at detector 188 and provide the necessary intelligence to infer the position of the object to be measured. Thus, if the length of the cavity is known, the length of the piston can be taken into account in inferring the position of the object.

If the reflectance of the mirrored surface 178 is thought to be equal to one and the reflectance at the other end of the cavity where the input and output ports are located is thought to be equal to R (less than one) and the round trip time increment from entering the input port and propagating down the tube to the mirrored surface 178 and returning to the output port 186 is symbolically indicated by $t_d$ and the intensity modulation frequency of the input light is done at a frequency of $f_c$ then the input light intensity may be characterized by the expression $A\sin(\omega_c t)$. The light entering into the cavity at the input port is then $(1-R)A\sin(\omega_c t)$. After propagating through the cavity and back again the first "bounce" out will be equal to $(1-R)(1-R)A\sin(\omega_c(t-t_d))$. The second "bounce" out will be equal to $(1-R)(1-R)RA\sin(\omega_c(t-2t_d))$. The nth "bounce" equals $(1-R)^2 R^{n-1} A\sin(\omega_c(t-nt_d))$.

The total light out is therefore equal to $$(1-R)^2 A \sum_{n=1}^{\infty} \sin(\omega_c(t-nt_d)) R^{n-1}$$

and $$P_T = (1-R)^2 A \sum_{n=1}^{\infty} \sin(\omega_c(t-\omega_c n t_d)) R^{n-1}$$

$$= (1-R)^2 A \left[ \sin(\omega_c t) \sum_{n=1}^{\infty} \cos(\omega_c n t_d) R^{n-1} - \cos(\omega_c t) \sum_{n=1}^{\infty} \sin(\omega_c n t_d) R^{n-1} \right]$$

$$P_T = (1-R)^2 A \left[ \cos(\omega_c t - \pi/2) \sum_{n=1}^{\infty} \cos(\omega_c n t_d) R^{n-1} - \cos(\omega_c t) \sum_{n=1}^{\infty} \sin(\omega_c n t_d) R^{n-1} \right]$$

If a Fourier transformation of the above expression is made where the identity $F\{\cos(\omega_c t + \phi)\} = e^{j\phi}\delta(f-f_c)$ is used, the following expression results:

$$P_T(f) = (1-R^2)A \left[ \delta(f-f_c) e^{j-\pi/2} \sum_{n=1}^{\infty} \cos(\omega_c n t_d) R^{n-1} - (f-f_c) \sum_{n=1}^{\infty} (\omega_c n t_d) R^{n-1} \right]$$

$$= (1-R)^2 A \delta(f-f_c) \left[ (-j) \sum_{n=1}^{\infty} \cos(\omega_c n t_d) R^{n-1} - \sum_{n=1}^{\infty} \sin(\omega_c n t_d) R^{n-1} \right]$$

And, removing the $\delta(f-f_c)$ term and expressing P as $P_T(\omega_c)$, we have:

$$P_T(\omega_c) = A(1-R)^2 \left[ -j \sum_{n=1}^{\infty} \cos(\omega_c n t_d) R^{n-1} - \sum_{n=1}^{\infty} \sin(\omega_c n t_d) R^{n-1} \right]$$

At resonance, $$P_T(\omega_R) = A(1-R)^2(-j)\sum_{n=1}^{\infty} R^{n-1}$$

$$= A(1-R)^2(-j)\left[\frac{1}{1-R}\right]$$

$$P_T(\omega_R) = -jA(1-R)$$

Referring now to FIG. 8, a control circuit 26a similar to the control circuit 26 of FIG. 1 is illustrated. It may be used in the device of FIG. 7 for continuous wave operation. It may be used for a similar purpose in the devices of FIG. 2 and FIG. 6.

If one were to attempt to find the frequency at which the output of the cavity 14g, 14h of FIG. 7 were maximized at the detector 188, by hand, one would introduce a number of different frequencies into the cavity using a variable frequency generator to modulate the intensity of the input light emanating from the source 180. Thus, one would vary the frequency continuously over a wide range looking for the particular frequency which maximizes the output. In so doing, one would first sweep across a relatively wide range of frequencies starting, perhaps, at a low frequency and steadily increasing frequency until an intensity maximum is encountered. At that point, a human operator would "dither" the frequency about a fairly narrow range in order to zero in on the exact frequency that gives the maximum output.

Just that sort of process is carried out by the circuit shown in block diagram format in FIG. 8. The function of the circuit it to determine automatically the maximum of the transducer frequency response curve shown in FIG. 12. The analogous manual operation would be to sweep an oscillator driving a resonator to find the peak response, on an oscilloscope trace. To find the peak automatically, a "dither" at frequency $f_m$ is used to generate an error proportional to the displacement of the input frequency from the tank tuned center frequency, $f_c$.

In the start-up, or scan mode, a switch 200 selects a step input signal on a line 202 from a step generator 204 which is applied to an integrator 206, which in turn applies a signal on a line 208 through a summing junction 210 to a voltage controlled oscillator (VCO) 212 which "sweeps" the center frequency of the VCO over a range beginning at a relatively low level and increasing to the level reached by the integrator at the top of the step. This corresponds to the human operator taking the dial of his variable frequency source and, starting at a low frequency, gradually increasing frequency.

A peak detector 214 and a comparator 216 serve to find the approximate location of $f_c$ by holding the value of the peak intensity and triggering the comparator when a fall off first occurs from a peak. This causes a flip-flop 218 to be triggered, switching the switch 200 and the circuit into the track mode. This corresponds to a human operator finding the approximate location of the peak and getting ready to zero in on the exact peak.

In the track mode, an envelope detector 220 provides the amplitude at any instantaneous frequency f, and a synchronous demodulation circuit 222 generates a signal which is non-zero when the VCO is not centered over the peak of the band pass. This error is integrated to drive the VCO eventually to the peak. This is done by means of a local oscillator 224 providing a superimposed "dither" signal on the output of the integrator by means of the summing junction. Thus, the integrated signal 208 provided to the VCO 212 has a dither signal superimposed on the integrated signal to provide a combined dithered integrated signal on a line 226 to the VCO. This corresponds to the human operator "dithering" the dial of his variable frequency generator to find the exact maximum intensity frequency. The VCO output is then provided to a frequency-to-digital (F/D) converter to the outside system, to be counted for generation of the transducer position data.

Figure 12:
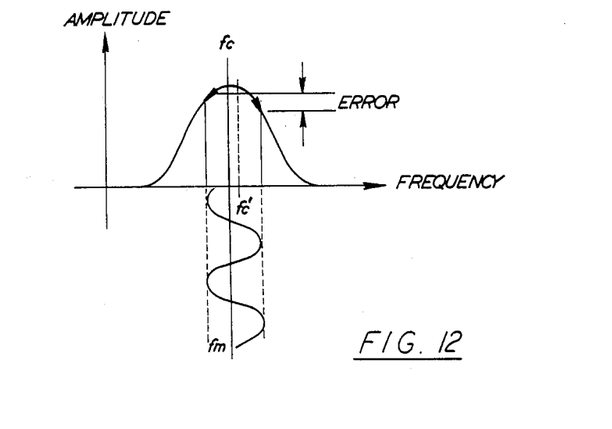
FIG. 12 is an illustration of a dynamically biased amplitude search such as would be accomplished by the circuit of FIG. 8.

FIG. 12 is an illustration of a modulating frequency $f_m$ from the local oscillator 224 of FIG. 8 corresponding to a signal on a line 228 provided to summing junction 210. The "dither" signal on line 228 is shown in FIG. 12 dithering the frequency of the input light in the cavity about a center frequency $f_c'$ which is separated from the actual tuned frequency of the cavity, $f_c$, as indicated by the magnitude of an error signal on a line 230 in FIG. 8 which is input to the integrator 206. Of course, the function of the control circuit of FIG. 8 is to zero this error and keep the light source zeroed in on this maximizing frequency so that the proper intelligence can be provided for determining the correct position of the transducer.

Figure 13:
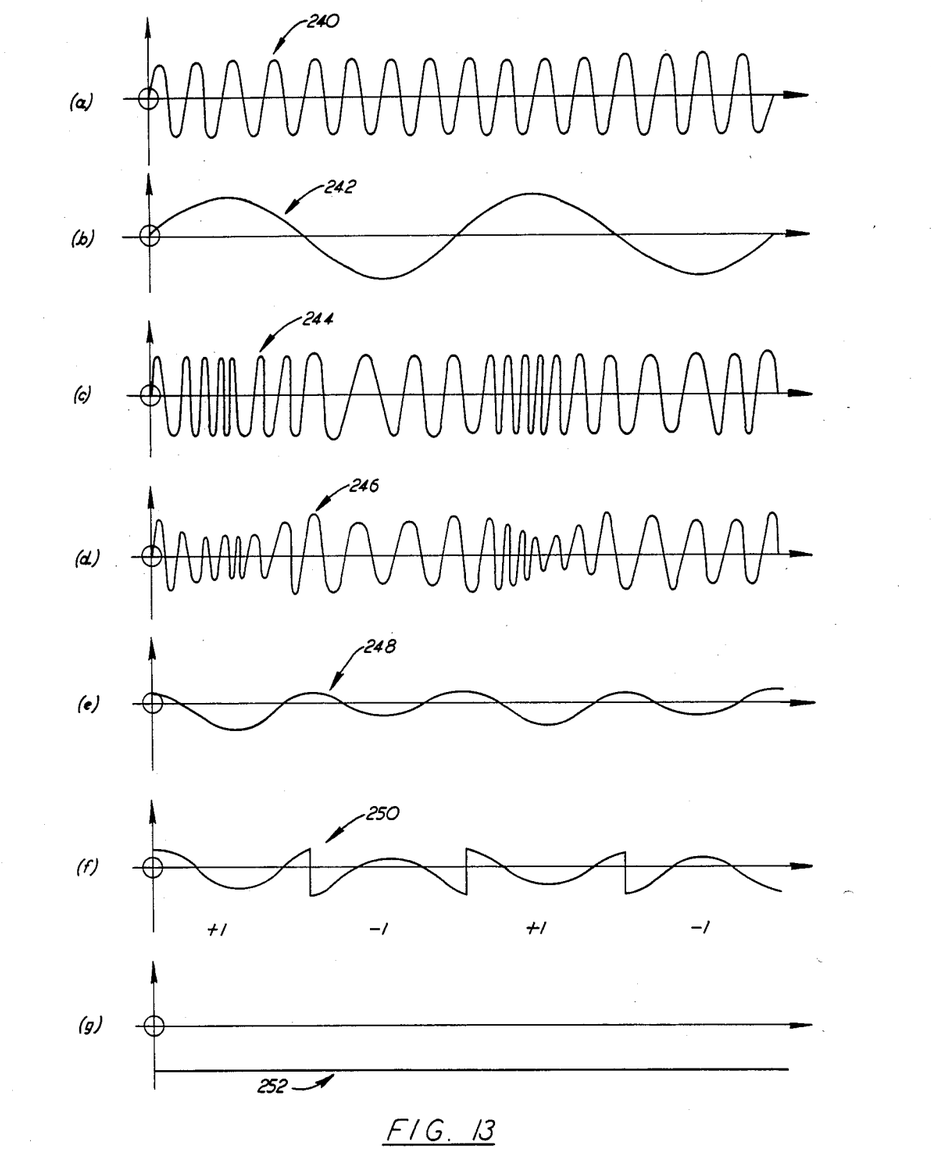
FIG. 13 is an illustration of several waveforms illustrating several of the signals present in the circuit of FIG. 8 for the case where the resonant frequency of the cavity has not yet been found by the circuitry.

FIG. 13 is an illustration of several waveforms of some of the signals of FIG. 8. FIG. 13(a) shows a waveform 240 indicative of the intensity of the light source 22 of FIG. 1 as would appear on line 28 of FIG. 8 without "dithering." For a typical case, the frequency of intensity modulation would be on the order of 50 megahertz. Intensity modulation at about that frequency implies a wavelength of about 4 meters, in glass. Thus, if the tube 174 of FIG. 7 is on the order of several centimeters in length, the delay line 14h will necessarily be on the order of slightly less than 4 meters for an integral wavelength. It could, of course, be equal to a fractional wavelength long, as described above, for constructive interference.

A waveform 242 is illustrated in FIG. 13(b) and is indicative of the voltage which appears on line 228 of FIG. 8 except that its frequency has been drawn not to scale in order to help to convey some of the concepts presented herein. In actuality, the frequency from the local oscillator 224 of FIG. 8, which provides the dithering frequency, will be on the order of about a few kilohertz, e.g., 3 kilohertz which has a wavelength of 100,000 meters. Thus, it will be seen that the time lines of FIGS. 13(a) and (b) are not the same and that the time line of waveform 242 has been compressed by a factor of about 2,083, for teaching purposes only. Thus, it will be understood that the time lines presented in FIG. 13 do not necessarily correspond absolutely but have been juxtaposed using different time lines for teaching purposes. The summation of the fundamental modulation frequency, $f_c'$, and the "dither" frequency, $f_m$, produces a frequency modulated fundamental frequency illustrated in FIG. 13(c). If a 3 kilohertz dither frequency is used in conjunction with a 50 megahertz "carrier" the carrier will be dithered from $48\frac{1}{2}$ megahertz to $51\frac{1}{2}$ megahertz. It should be understood that the waveform 244 shown in FIG. 13(c) is not drawn to scale but does have approximately the same time line as that shown in FIG. 13(a). The waveform 244 corresponds to the signal on the line 24 of FIG. 8.

FIG. 13(d) illustrates a waveform 246 which has been amplitude modulated due to the frequency transfer characteristic of the optical cavity 14g, 14h of FIG. 7 at its present length. It is assumed, for purposes of FIG.

13, that the carrier frequency illustrated by waveform 240 in FIG. 13(a) does not correspond to the center frequency of the frequency transfer characteristic of the optical cavity at its length. This will result in an error signal similar to that shown in FIG. 12.

FIG. 13(e) is an illustration of a waveform 248 corresponding to a signal on a line 250 in FIG. 8 from the envelope detector 220. The envelope detector detects the amplitude modulation produced in the cavity by the "dither". In this particular case, the dither produces a second harmonic plus some first harmonic of the dither frequency which is zero-averaged in the envelope detector. A synchronous demodulator 222 compares the envelope to the dither frequency itself and provides a signal (not shown) having a waveform 250 illustrated in FIG. 13(f). The synchronous demodulator can be thought of as a multiplier which senses the sign of the voltage on line 228 from the local oscillator and multiplies the voltage on line 250 (as evidenced by wave form 248 in FIG. 13(e)) by plus or minus one.

The synchronous demodulator also filters (not shown) the signal represented by waveform 250 to provide a filtered error signal on line 230 as illustrated by a waveform 252 in FIG. 13(g).

Figure 14:
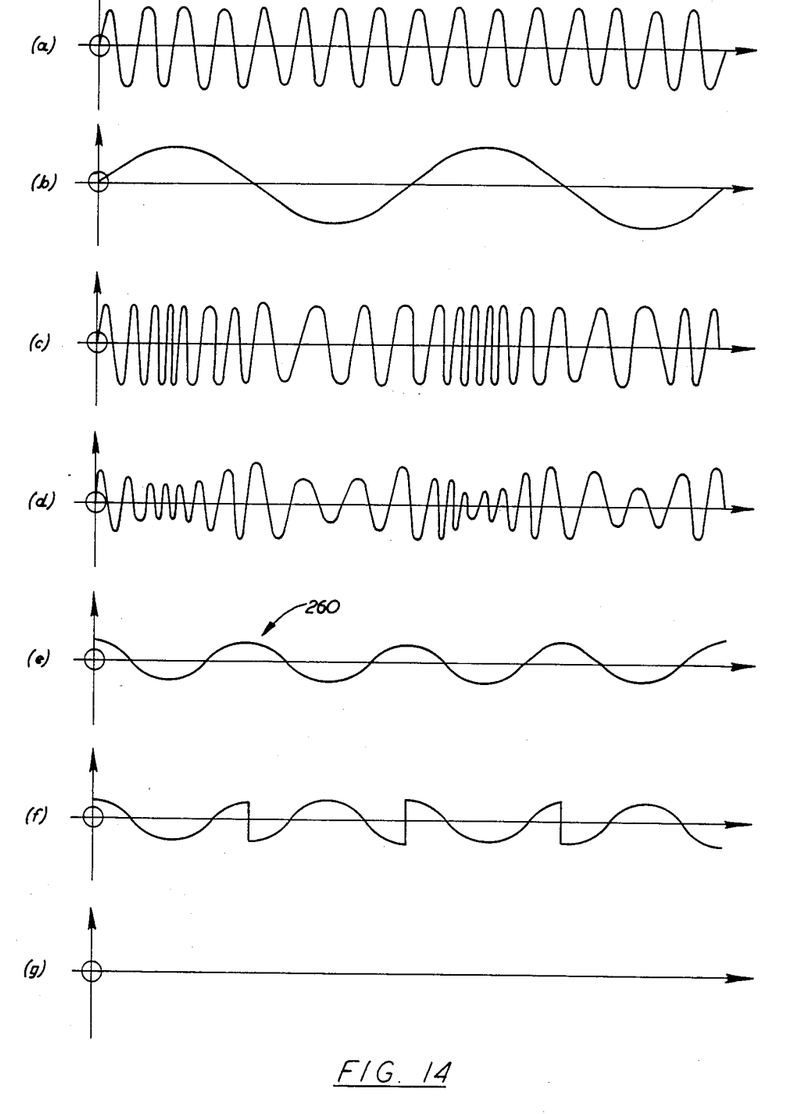
FIG. 14 is an illustration of several waveforms illustrating several of the signals in the circuitry of FIG. 8 after the tuned frequency has been found.

FIG. 14(a) through FIG. 14(g) illustrate the case where the present operating frequency of the fundamental "carrier" intensity modulating frequency corresponds exactly to the center frequency of the frequency transfer characteristic of the optical cavity at its length. Thus, the envelope detector provides a waveform 260 as illustrated in FIG. 14(e) which has only the second harmonic of the dither frequency out of the envelope detector. The synchronous demodulator provides an error signal which is exactly equal to zero as shown in FIGS. 14(f) and (g).

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A method, comprising the steps of:
providing amplitude modulated input light to a passive optical resonator having a variable length dimension for resonating according to the magnitude of the variable length dimension of the resonator in response to a corresponding frequency of amplitude modulated input light;
detecting output light from the passive optical resonator and providing a detected signal indicative of the intensity thereof;
increasing the frequency of the amplitude modulated input light, as indicated by an increasing magnitude of the detected signal, from a frequency less than the frequency at which resonance occurs at the longest length of the variable length dimension to a frequency greater than the frequency at which resonance occurs, as indicated by a decreasing magnitude of the detected signal;
periodically increasing and decreasing the frequency of the amplitude modulated input light over a dithering range above and below the resonant frequency;
gradually decreasing the dithering range to zero such that the magnitude of the detected signal is maximum;
determining the resonant frequency which produces the maximum detected signals; and
relating the determined resonant frequency to the length of the resonator.

2. A method, comprising the steps of:
providing amplitude modulated input light to a passive optical resonator comprising an optical fiber delay line having an index of refraction matched to the index of refraction of a fluid in an enclosure in which the delay line is inserted, the fiber delay line having a mirrored surface at a light input end thereof, the enclosure having a movable mirror at an end opposite the end of the enclosure at which the delay line is inserted for reflecting the input light back and forth between the mirrored surface and the movable mirror for resonating at a determined resonant frequency;
detecting output light from the passive optical resonator and providing a detected signal indicative of the intensity thereof;
determining, in response to the detected signal, the resonant frequency of amplitude modulated input light that produces the maximum intensity within the resonator; and
relating the determined resonant frequency to the length of the resonator.

3. Apparatus for determining position, comprising:
a passive optical resonator having a cavity with variable length dimension relating to the position to be determined, the resonator having a resonator frequency that changes according to the magnitude of the variable length dimension, the resonator also having: (i) an input light port responsive to amplitude modulated input light, and (ii) an output light port for providing output light indicative of the intensity of the light within the resonator for determining an input light resonant frequency of amplitude modulation having a wavelength related to the magnitude of the variable length dimension; and
means for determining the resonant frequency corresponding to the magnitude of the variable length dimension of the resonator cavity by varying the amplitude modulation frequency input light until the average intensity of the output light is maximized.

4. Apparatus for determining position, comprising:
a passive optical resonator having a variable length dimension related to the position to be determined, the resonator having a resonant frequency that changes according to the magnitude of the variable length dimension, the resonant also having:
an input light port responsive to amplitude modulated input light, the resonator having
an output light port for providing output light indicative of the intensity of the light within the resonator for determining an input light resonant frequency of amplitude modulation having a wavelength related to the magnitude of the variable length dimension;
a movable mirror at one end of the variable length dimension;
a second mirror at the other end of the variable length dimension for reflecting the amplitude modulated input light between the mirrors, the second mirror being on the end of an optical fiber delay line having an index of refraction matched to that of a fluid in an enclosure in which the delay line is inserted, the fiber delay line having the second mirror on the noninserted end.

5. Apparatus for determining position, comprising:

a passive optical resonator having a variable length dimension related to the position to be determined, the resonator having a resonator frequency that changes according to the magnitude of the variable length dimension, the resonator having an input light port responsive to amplitude modulated input light, the resonator having an output light port for providing output light indicative of the intensity of the light within the resonator for determining an input light resonant frequency of amplitude modulation having a wavelength related to the magnitude of the variable length dimension;

means for dithering the frequency of amplitude modulation of the input light over a selected range above and below the frequency at which the detected intensity of the output light is maximum, in order to produce additional amplitude modulation of amplitude modulated light in the resonator, the additional amplitude modulation being indicative of the difference between the dithered frequency and the frequency at which the detected intensity of the output light is maximum;

means for detecting the amplitude modulated envelope of the additional modulation of the input light and providing a zero-average envelope signal indicative thereof;

means for synchronously demodulating the envelope signal with respect to a signal indicative of the dithering frequency and means for providing an error signal indicative of the difference between the frequency at which the detected intensity of the output light is maximum and the dithered frequency;

means for integrating the error signal and providing a frequency command signal for commanding a frequency of amplitude modulation at which the detected intensity is maximum; and means for amplitude modulating the input light at the maximizing frequency in response to the command signal, thereby reducing the error signal to zero magnitude.

* * * * *

UNITED STATES PATENT AND TRADEMARK OFFICE
CERTIFICATE OF CORRECTION

PATENT NO. : 4,738,527
DATED : April 19, 1988
INVENTOR(S) : Gregory J. McBrien

It is certified that error appears in the above-identified patent and that said Letters Patent is hereby corrected as shown below:

Column 10, line 49. Cancel "$(f-f_c)\sum_{n=1}^{\infty}(\omega_c nt_d)R^{n-1}$" and substitute -- $(f-f_c)\sum_{n=1}^{\infty}\sin(\omega_c nt_d)R^{n-1}$ --

Column 12, line 68 Cancel "present"

Claim 4, column 14, line 53. Cancel "resonant" and substitute
-- resonator --

Claim 5, column 15, line 7. Cancel "resonator frequency" and substitute
-- resonant frequency --

Signed and Sealed this

Seventh Day of February, 1989

Attest:

DONALD J. QUIGG

Attesting Officer   Commissioner of Patents and Trademarks